United States Patent [19]
Najera

[11] Patent Number: 5,845,521
[45] Date of Patent: Dec. 8, 1998

[54] ANTITHEFT ARTICLE FOR MOTOR VEHICLES AND METHOD OF OPERATION

[76] Inventor: Benito A. Najera, 602 W. Arcadia Dr., Tucson, Ariz. 85706

[21] Appl. No.: 929,047

[22] Filed: Sep. 15, 1997

[51] Int. Cl.⁶ .................................................. B60R 25/08
[52] U.S. Cl. .............................. 70/56; 70/160; 70/203; 70/237
[58] Field of Search ............................. 70/198–203, 237, 70/158–164, 212, 54–56, 180

[56] References Cited

U.S. PATENT DOCUMENTS

| | | | |
|---|---|---|---|
| 1,025,180 | 5/1912 | Wreford | 70/203 |
| 1,199,402 | 9/1916 | Merschdorf | 70/200 |
| 1,251,591 | 1/1918 | Stoddart | 70/178 |
| 1,343,459 | 6/1920 | Lacy | 70/232 |
| 1,475,863 | 11/1923 | Pate | 70/199 |
| 1,560,251 | 11/1925 | De Rouville et al. | 70/200 |
| 1,579,395 | 4/1926 | Rohm et al. | 70/199 |
| 4,333,326 | 6/1982 | Winters | 70/203 |
| 5,094,092 | 3/1992 | Hsieh | 70/199 |
| 5,359,868 | 11/1994 | Villani | 70/203 |

FOREIGN PATENT DOCUMENTS

| | | | |
|---|---|---|---|
| 999336 | 1/1952 | France | 70/200 |
| 2443946 | 8/1980 | France | 70/203 |
| 2255060 | 10/1992 | United Kingdom | 70/199 |
| 2263260 | 7/1993 | United Kingdom | 70/199 |

*Primary Examiner*—Lloyd A. Gail
*Attorney, Agent, or Firm*—Antonio R. Durando

[57] ABSTRACT

An antitheft article for a motor vehicle has two parts which are pivotable relative to one another between an open position and a closed position. Each of the parts resembles a box having an open side, and the open sides of the box-like parts face each other. A padlock is fixed to one of the box-like parts, and a tubular element for receiving the shackle of the padlock is fixed to the other of the box-like parts. One of the box-like parts is further provided with a pedestal. In operation, the box-like parts are opened and placed around the tread of the brake pedal with the pedestal facing the floorboard of the vehicle. The box-like parts are closed and, in the process, the shackle of the padlock passes through the tubular element. The padlock is locked thereby fixing the box-like parts with respect to one another. Cutouts are formed in the box-like parts for the lever supporting the tread of the brake pedal. If an attempt is made to depress the brake pedal, the pedestal comes into abutment with the floorboard of the vehicle and prevents the brake pedal from activating the brakes.

13 Claims, 3 Drawing Sheets

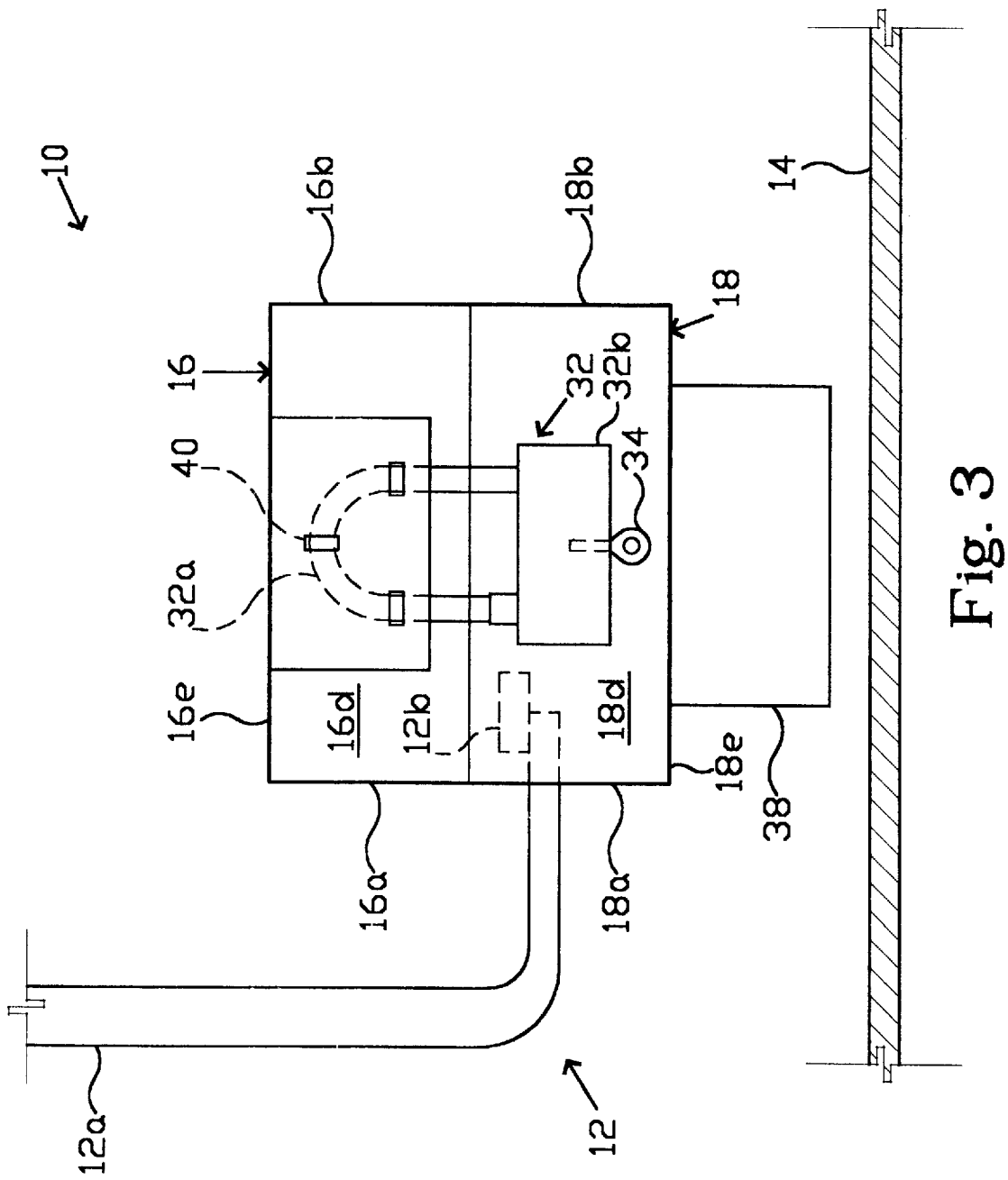

ANTITHEFT ARTICLE FOR MOTOR VEHICLES AND METHOD OF OPERATION

BACKGROUND OF THE INVENTION

1. Field of the Invention

The invention relates to theft prevention of conveyances.

2. Description of the Prior Art

Antitheft systems for motor vehicles come in various forms. There are systems which generate an audible alarm, systems which lock the steering wheel when the ignition is turned off, systems which prevent ignition or cause stalling and systems which emit a signal detectable by law enforcement personnel. All of these systems are relatively expensive and generally require professional installation.

Another system includes a U-shaped member which can be mounted on the steering wheel of a motor vehicle and locked to restrict turning of the steering wheel. This system is relatively cheap and can be installed without professional help. However, if the motor vehicle is hot-wired, limited operation of the vehicle is still possible without undue hazard.

SUMMARY OF THE INVENTION

It is an object of the invention to provide an antitheft article which can be installed on a conveyance without professional assistance so as to make operation of the conveyance hazardous or virtually impossible.

Another object of the invention is to provide a method which can be performed without professional aid and is able to essentially preclude safe operation of a conveyance.

The preceding objects, as well as others which will become apparent the description proceeds, are achieved by the invention.

One aspect of the invention resides in an antitheft article for a conveyance having a control member displaceable from an inoperative position to regulate movement of the conveyance. The article comprises an assembly which includes a restraint for the control member, and means for locking the control member in the restraint. The assembly has a bearing portion which comes to bear against an abutment of the conveyance so as to limit displacement of the control member when the control member is urged away from its inoperative position. In a motor vehicle, the control member preferably comprises the brake pedal.

The antitheft article in accordance with the invention is of a type which is already commonly used without professional help, namely, a type having a restraint and a locking means. Thus, the antitheft article of the invention can be designed for installation without the assistance of a professional.

The antitheft article according to the invention is arranged to be mounted on a control member which is displaceable from an inoperative position to regulate movement of a conveyance. The article has a bearing portion which comes to bear against an abutment of the conveyance when the control member is urged away from the inoperative position. By appropriate design of the article, the control member can be prevented from properly regulating movement of the conveyance. It then becomes impossible or virtually impossible to operate the conveyance.

Another aspect of the invention resides in a method of hampering the theft of a conveyance having a control member displaceable from an inoperative position to regulate movement of the conveyance. The method comprises the step of inhibiting displacement of the control member away from the inoperative position.

The inhibiting step may involve locking a portion of the control member in a confining space.

Additional features and advantages of the invention will be forthcoming from the following detailed description of preferred embodiments when read in conjunction with the accompanying drawings.

BRIEF DESCRIPTION OF THE DRAWINGS

FIG. 3 is a side view of the antitheft article of FIG. 1.

DESCRIPTION OF THE PREFERRED EMBODIMENTS

Figure 1:
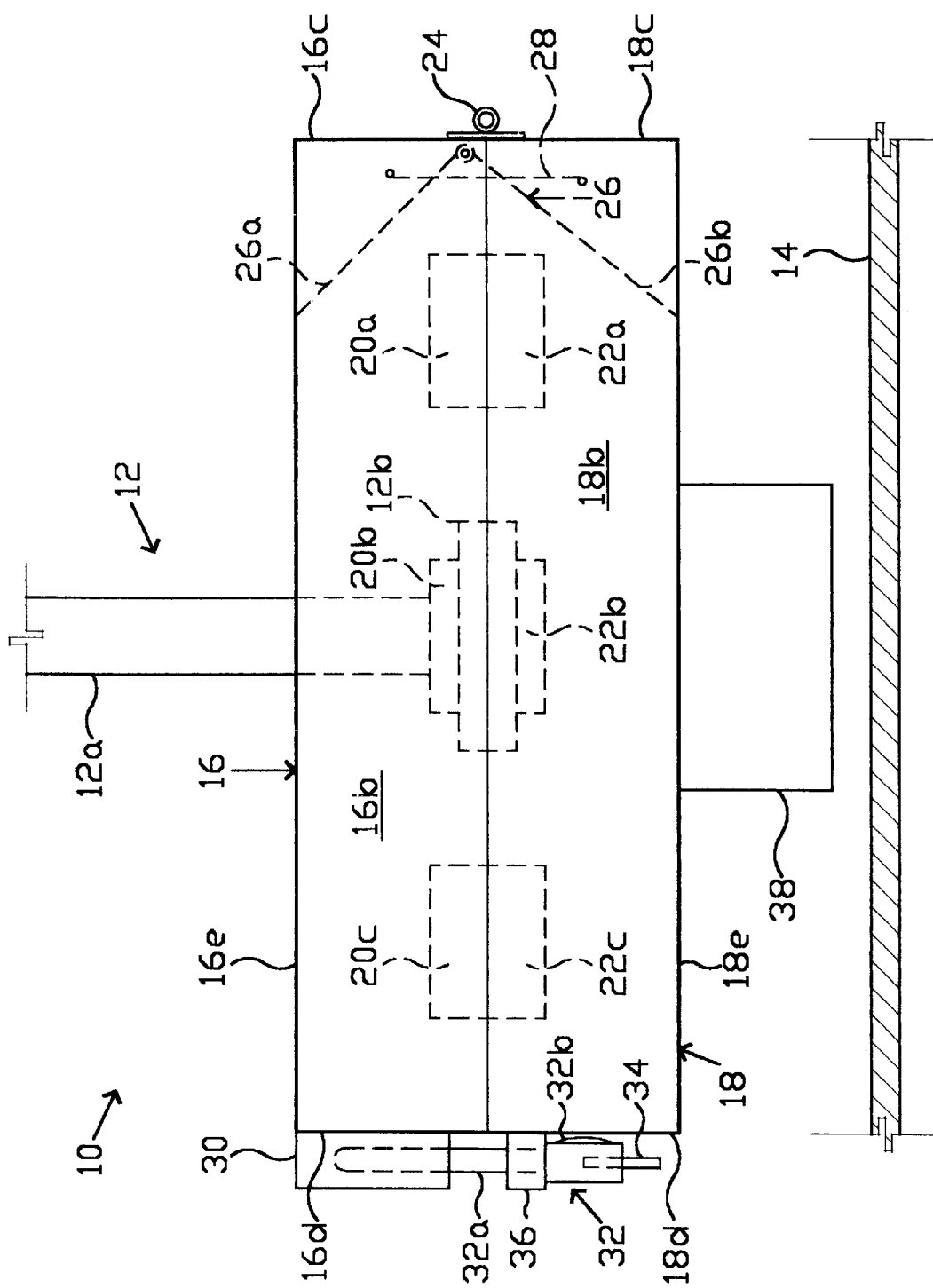
FIG. 1 is a front view of an antitheft article which is designed for use on a conveyance and is formed in accordance with the invention.
Figure 2:
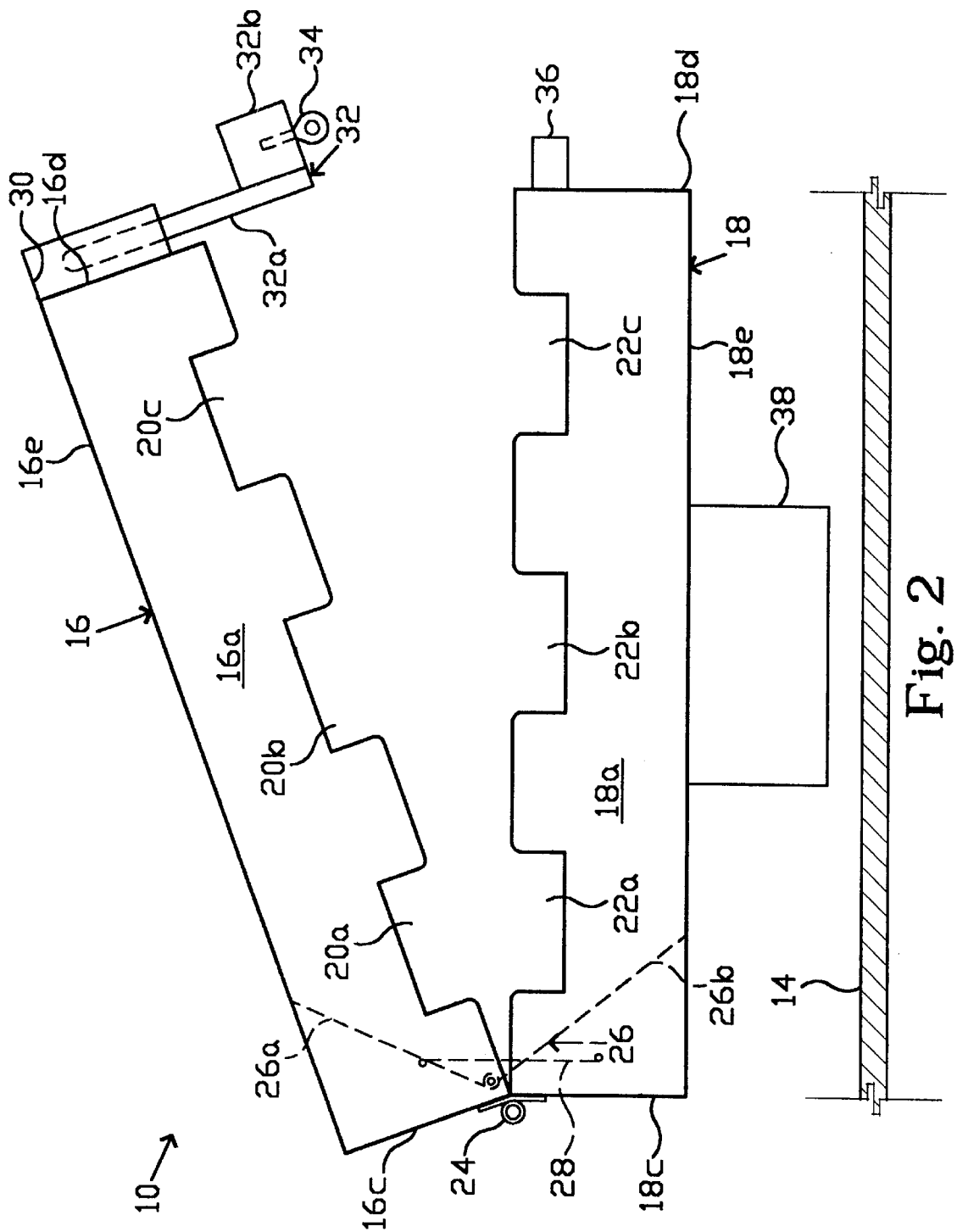
FIG. 2 is a rear view of the antitheft article of FIG. 1.

Referring to FIGS. 1–3, the numeral 10 identifies an antitheft article according to the invention. The antitheft article 10 is designed to inhibit the theft of a conveyance which is here assumed to be a motor vehicle. The motor vehicle, which can be a car, truck, bus, etc., has a brake pedal 12 which is mounted above a floorboard 14. The brake pedal 12 includes a lever 12a as well as a tread 12b which is supported by the lever 12a and is depressed by a driver of the motor vehicle to engage the brakes.

The brake pedal 12 constitutes a control member which serves to regulate the movement of the motor vehicle. The brake pedal 12 has an inoperative position in which the brakes of the motor vehicle are disengaged, and FIGS. 1 and 3 illustrate such position. The brake pedal 12 is displaceable from the inoperative to regulate the speed of the motor vehicle.

The floorboard 14 of the motor vehicle constitutes an abutment as will become apparent.

The antitheft article 10 comprises an upper part 16 and a lower part 18. The upper part 16 is generally rectangular and resembles a box which is open at the bottom. Thus, the upper part 16 has a pair of elongated side walls 16a and 16b, a pair of end wells 16c and 16d which are shorter or narrower than the side walls 16a,16b, and a top wall 16e. The side walls 16a,16b are spaced from and parallel to one another as are the end walls 16c,16d, and the walls 16a–16e cooperate to define a compartment in the upper part 16.

The side wall 16a is provided with three cutouts 20a, 20b and 20c.

The lower part 18 of the antitheft article 10 is again generally rectangular and resembles a box which is open at the top. Thus, the lower part 18 has a pair of elongated side walls 18a and 18b, a pair of end walls 18c and 18d which are shorter or narrower than the side walls 18a,18b, and a bottom wall 18e. The side walls 18a,18b are spaced from and parallel to one another as are the end walls 18c,18d, and the walls 18a–18e cooperate to define a compartment in the lower part 18.

The side wall 18a is provided with three cutouts 22a, 22b and 22c.

The box-like parts 16,18 are arranged with the side walls 16a,18a in a common plane and the side walls 16b,18b in a common plane. The end walls 16c,18c are located adjacent one another, and the end wall 16c is connected to the end wall 18c by a hinge 24. The hinge 24 allows the parts 16,18 to pivot relative to one another between a closed position shown in FIGS. 1 and 3 and an open Position shown in FIG. 2. In the closed position, the end walls 16c,18c are disposed in a common plane as are the end walls 16d,18d.

The cutout 20a faces the cutout 22a, the cutout 20b faces the cutout 22b, and the cutout 20c faces the cutout 22c. The cutouts 20a–20c and 22a–22c are positioned such that, in the closed position of the box-like parts 16,18, the cutout 20a is located opposite and registers with the cutout 22a. Likewise, the cutout 20b is located opposite and registers with the cutout 22b while the cutout 20c is located opposite and registers with the cutout 22c. Each pair of registering cutouts 20a,22a; 20b,22b; and 20c,22c defines a passage between the compartments in the box-like parts 16,18 and the exterior of the parts 16,18.

A spring or biasing member 26 is mounted in the compartments of the box-like parts 16,18 near the end walls 16c,18c. The spring 26 has a leg 26a which bears against the inner surface of the top wall 16e and a second leg 26b which bears against the inner surface of the bottom wall 18e. The spring 26 continuously urges the parts 16,18 to the open position of FIG. 2.

Also mounted in the compartments of the box-like parts 16,18 is a chain 28. One end of the chain is secured to the side wall 16a while the other end is secured to the side wall 18a. Alternatively, the two ends of the chain 28 can be secured to the side walls 16b and 18b, respectively. The chain 28 serves as a stop to limit relative movement of the parts 16,18 away from the closed position of FIGS. 1 and 3.

A downwardly open housing 30 is mounted on the end wall 16d, and a padlock 32 extends into the housing 30 through the open lower side thereof. The padlock 32 includes a shackle 32a as well as a bolt 32b having a keyhole for a key 34. The padlock 32 is conventional, and the bolt 32b is pivotally mounted on one end of the shackle 32a. The other end of the shackle 32a can be inserted and locked in the bolt 32b, and this end of the shackle 32a is releasable from the bolt 32b by placing the key 34 in the keyhole and turning the key 34.

The bolt 32b is situated below the housing 30 while the major part of the shackle 32a is located inside the housing 30. The portion of the shackle 32a in the housing 30 is fixed to the end wall 16d by three clamping members 40 which are welded to the end wall 16d. The clamping members 40 can, for instance, be constituted by bent pins. The end of the shackle 32a which is releasable from the bolt 32b projects downward through the open lower side of the housing 30 to a level below such side.

An arresting member or latch in the form of a tubular element 36 is mounted on the end wall 18d. The tubular element 36, which can be constituted by a pipe segment, is positioned so that the releasable end of the shackle 32a can pass through the tubular element 36 when the box-like parts 16,18 are moved from the open position to the closed position. In the closed position, the bolt 32b is located at a level below the tubular element 36 whereas the releasable end of the shackle 32a projects beyond the lower end of the tubular element 36. This allows the releasable end of the shackle 32a to be inserted and locked in the bolt 32b to thereby lock the box-like parts 16,18 to one another.

A pedestal or protrusion 38 projects downward from the lower surface of the bottom wall 18e of the box-like part 18. The pedestal 38 forms a bearing member which, under appropriate circumstances, comes into abutment with and bears against the floorboard 14 of the motor vehicle. The pedestal 38 is to generally rectangular and is narrower than the box-like parts 16,18.

The antitheft article 10 can be considered a lockbox. The parts 16,18 of the antitheft article 10 at least in part constitute a restraint for the brake pedal 12.

The box-like parts 16,18, the housing 30 and the pedestal 38 can be made from sheet metal of relatively heavy gauge, e.g., sheet steel having a thickness of 1/32 inch.

Assuming that the motor vehicle has an automatic transmission and that the brake pedal 12 is in its inoperative position, the operation of the antitheft article 10 is as follows:

The padlock 32 is opened and the bolt 32b is pivoted away from the releasable end of the shackle 32a. The box-like parts 16,18 are brought to the open position and placed around the tread 12b of the brake pedal 12 as well as around the adjoining portion of the lever 12a. The box-like parts 16,18 are positioned so that this portion of the lever 12a is aligned with the cutouts 20b,22b in the side walls 16a,18a. Furthermore, the box-like parts 16,18 are oriented with the pedestal 38 confronting the floorboard 14 of the motor vehicle.

Once the box-like parts 16,18 have been placed around the tread 12b and the adjacent portion of the lever 12a, the parts 16,18 are moved to the closed position. In the process, the tread 12b is confined inside the box-like parts 16,18 with the lever 12a extending through the passage defined by the cutouts 20b,22b. Moreover, the releasable end of the shackle 32a passes through the tubular element 36. When the parts 16,18 are in the closed position, the bolt 32b is pivoted back to the releasable end of the shackle 32a which is inserted and locked in the bolt 32b to lock the parts 16,18 to one another.

In the inoperative position of the brake pedal 12, the pedestal 38 is spaced from the floorboard 14 of the motor vehicle by a small clearance. If an attempt is made to depress the brake pedal 12 by pushing on the antitheft article 10, the pedestal 38 comes into abutment with the floorboard 14 upon being displaced through the clearance. Further depression of the brake pedal 12 is then no longer possible. The clearance is selected in such a manner that the brakes are not engaged, or not engaged effectively, when the pedestal 38 abuts the floorboard 14. The motor vehicle cannot be driven since there is little or no braking effect.

To remove the antitheft article 10, the padlock 32 is opened and the bolt 32b is swung away from the releasable end of the shackle 32a. The box-like parts 16,18 are pivoted to the open position and withdrawn from the brake pedal 12.

The two pairs of cutouts 20a,22a and 20c,22c are employed in motor vehicles with a stick shift. One of the pairs of cutouts 20a,22a and 20c,22c is used to confine the tread of the clutch pedal while the other of the pairs of cutouts 20a,22a and 20c,22c is used to confine the tread of the brake pedal.

The antitheft article 10 can be installed quickly and simply without professional help. When placed around the brake pedal of a motor vehicle, the antitheft article 10 inhibits theft by making operation of the motor vehicle hazardous. Moreover, since the antitheft article 10 is not easily accessible when it confines a brake pedal, removal of the antitheft article 10 by someone wishing to steal the motor vehicle is relatively difficult.

Various modifications are possible within the meaning and range of equivalence of the appended claims.

I claim:

1. An antitheft article for a conveyance having a control member displaceable from an inoperative position to regulate movement of the conveyance, said article comprising:
   a restraint for the control member, said restraint including two parts which are pivotable relative to one another between an open position in which said restraint can be placed around the control member and a closed position in which the control member can be confined by said restraint, and said restraint further including means pivotally connecting said parts to one another, at least one of said parts comprising a container which defines a compartment for the control member, and said one part having an external surface section, said restraint having a bearing portion for bearing against an abutment of the conveyance, and thereby limiting displacement of the control member, when the control member is urged away from its inoperative position;

a lock for locking the control member in said restraint, said lock including a shackle and an anchoring member for said shackle mounted on said shackle;

means mounting said shackle on said external surface section; and a housing on said external surface section confining at least a portion of said mounting means and at least a portion of said shackle.

2. The article of claim 1, further comprising means for biasing said parts to said open position.

3. The article of claim 1, further comprising means for limiting relative movement of said parts away from said closed position.

4. The article of claim 3, wherein said limiting means comprises a chain.

5. The article of claim 1, wherein one of said parts is provided with a cutout for the control member.

6. The article of claim 5, wherein the other of said parts is provided with a cutout for the control member, said cutout being in substantial register in said closed position.

7. The article of claim 1, wherein said one part is provided with a cutout for the control member, said cutout establishing access to said compartment in said closed position.

8. The article of claim 1, wherein said parts comprise box-like members.

9. The article of claim 1, wherein one of said parts has a surface facing away from the other of said parts, said bearing portion including a protrusion which projects from said surface.

10. The article of claim 9, wherein said protrusion is narrower than said one part.

11. The article of claim 9, wherein said parts comprise generally rectangular members and said protrusion is generally rectangular.

12. The article of claim 1, further comprising an arresting member on the other of said parts, said arresting member being engageable by said lock to fix said parts to one another.

13. The article of claim 12, wherein said anchoring member comprises a bolt and said arresting member includes a tubular element designed to receive said shackle.

* * * * *